US012671522B2

(12) United States Patent
Yue et al.

(10) Patent No.:     US 12,671,522 B2
(45) Date of Patent:       Jun. 30, 2026

(54) METHOD AND APPARATUS FOR HANDLING TIME-SENSITIVE TRANSMISSION

(71) Applicant: Lenovo (Beijing) Limited, Beijing (CN)

(72) Inventors: Ran Yue, Haidian District (CN); Jing Han, Chaoyang District (CN); Haiming Wang, Xicheng District (CN); Jianning Liu, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 558 days.

(21) Appl. No.: 18/002,409

(22) PCT Filed: Jun. 24, 2020

(86) PCT No.: PCT/CN2020/098168
§ 371 (c)(1),
(2) Date: Dec. 19, 2022

(87) PCT Pub. No.: WO2021/258347
PCT Pub. Date: Dec. 30, 2021

(65) Prior Publication Data
US 2023/0231655 A1     Jul. 20, 2023

(51) Int. Cl.
*H04L 1/08*          (2006.01)
*H04W 28/02*      (2009.01)

(52) U.S. Cl.
CPC ........... *H04L 1/08* (2013.01); *H04W 28/0268* (2013.01)

(58) Field of Classification Search
CPC ....... H04L 1/08; H04L 1/1887; H04L 5/0051; H04L 5/0055; H04L 5/0057;
(Continued)

(56) References Cited

U.S. PATENT DOCUMENTS

| | | | |
|---|---|---|---|
| 2011/0092201 A1* | 4/2011 | Lindstrom ............ | H04W 24/10 455/424 |
| 2019/0273581 A1* | 9/2019 | Zhu ....................... | H04W 80/02 |

(Continued)

FOREIGN PATENT DOCUMENTS

| | | | | |
|---|---|---|---|---|
| CN | 102084682 A | * | 6/2011 | ........... H04W 24/10 |
| CN | 104836648 B | * | 3/2018 | |

(Continued)

OTHER PUBLICATIONS

M. Centenaro, D. Laselva, J. Steiner, K. Pedersen and P. Mogensen, "System-Level Study of Data Duplication Enhancements for 5G Downlink URLLC," in IEEE Access, vol. 8, pp. 565-578, 2020, doi: 10.1109/ACCESS.2019.2961658 (Year: 2019).*

(Continued)

*Primary Examiner* — Ayaz R Sheikh
*Assistant Examiner* — Louis Samara
(74) *Attorney, Agent, or Firm* — FIG. 1 Patents

(57)          ABSTRACT
Embodiments of the present application are directed to a method and apparatus for handling time-sensitive transmission. The method may include: determining there is an overlap between a first time period for performing a measurement and a second time period for data transmission or data reception; and determining whether the data transmission or the data reception is performed based on a rule.

12 Claims, 5 Drawing Sheets

(58) Field of Classification Search
CPC ............. H04W 28/0268; H04W 48/16; H04W
36/0058; H04W 24/10
See application file for complete search history.

(56) References Cited

U.S. PATENT DOCUMENTS

| | | | | |
|---|---|---|---|---|
| 2020/0162211 A1* | 5/2020 | Wang | .................... | H04L 5/0091 |
| 2020/0366423 A1* | 11/2020 | Lee | ........................ | H04L 1/1887 |
| 2021/0105093 A1* | 4/2021 | Kong | .................... | H04L 1/1867 |
| 2021/0184788 A1* | 6/2021 | Lu | ......................... | H04L 1/0025 |
| 2021/0314831 A1* | 10/2021 | Ozturk | .............. | H04W 36/0058 |
| 2022/0264680 A1* | 8/2022 | Kim | ....................... | H04W 76/15 |
| 2023/0120096 A1* | 4/2023 | Kim | ........................ | H04L 69/28 |
| | | | | 370/329 |

FOREIGN PATENT DOCUMENTS

| | | | | | |
|---|---|---|---|---|---|
| CN | 107852622 A | | 3/2018 | | |
| CN | 110971371 A | * | 4/2020 | ............ | H04W 24/08 |
| CN | 111327404 A | * | 6/2020 | ............ | H04L 24/08 |
| WO | WO-2020063438 A1 | * | 4/2020 | ........... | H04L 1/1848 |

OTHER PUBLICATIONS

J. Rao and S. Vrzic, "Packet duplication for URLLC in 5G dual connectivity architecture," 2018 IEEE Wireless Communications and Networking Conference (WCNC), Barcelona, Spain, 2018, pp. 1-6, doi: 10.1109/WCNC.2018.8377054 (Year: 2018).*
CMCC , "Summary of e-mail discussion: [106#54] [IIoT] Need for and details of UE-based mechanisms for PDCP duplication (CMCC)", 3GPP TSG-RAN WG2 Meeting #107, R2-1909444, Prague, Czech Republic, Aug. 2019, 24 pages (Year: 2019).*

202080102302.3 , "Foreign Office Action", CN Application No. 202080102302.3, Sep. 18, 2024, 16 pages.
CMCC , "Summary of e-mail discussion: [106#54] [IIoT] Need for and details of UE-based mechanisms for PDCP duplication (CMCC)", 3GPP TSG-RAN WG2 Meeting #107, R2-1909444, Prague, Czech Republic, Aug. 2019, 24 pages.
ZTE Corporation , "Discussion on UE based PDCP Duplication activation/deactivation", 3GPP TSG RAN WG2 Meeting #107bis, R2-1913045, ChongQing, China, Oct. 2019, 3 pages.
20942107.2 , "Extended European Search Report", European Application No. 20942107.2, Feb. 20, 2024, 10 pages.
Ericsson , "MAC Handling of Measurement Gaps", 3GPP Draft; R2-083889 (Handling of Measurement Gaps), 3rd Generation Partnership Project (3GPP), Aug. 12, 2008, 3 pages.
Huawei , et al., "On handling of URLLC traffic during measurement gaps in uplink", 3GPP Draft; R2-1907387 On Handling of URLLC Traffic During Measurement Gaps in Uplink, 3rd Generation Partnership Project (3GPP), URL:<http://www.3gpp.org/ftp/Meetings%5F3GPP%5FSYNC/RAN2/Docs/R2%2DI907387%2Ezip>, May 13, 2019, 3 pages.
Huawei , "Remaining issues on the msgA transmission", 3GPP TSG-RAN WG2 #108, R2-1916017, Reno, Nevada [retrieved Dec. 14, 2022]. Retrieved from the Internet <https://www.3gpp.org/ftp/tsg_ran/WG2_RL2/TSGR2_108/Docs>., Nov. 2019, 4 Pages.
PCT/CN2020/098168 , "International Preliminary Report on Patentability", PCT Application No. PCT/CN2020/098168, Jan. 5, 2023, 5 pages.
PCT/CN2020/098168 , "International Search Report and Written Opinion", PCT Application No. PCT/CN2020/098168, Mar. 11, 2021, 6 pages.
"Foreign Office Action", CN Application No. 202080102302.3, Mar. 19, 2025, 14 pages.

* cited by examiner

METHOD AND APPARATUS FOR HANDLING TIME-SENSITIVE TRANSMISSION

TECHNICAL FIELD

The present application generally relates to wireless communication technology, and especially to a method and apparatus for handling time-sensitive transmission when there is an overlap between the time-sensitive transmission and measurement gap.

BACKGROUND

Radio resource management (RRM) measurements are required to provide ubiquitous coverage for a user equipment (UE). Network configures the UE to measure downlink quality and report the measurement results. The measurements can be of intra-frequency, inter-frequency and inter-radio access technology (RAT). Measurement gap indicates periods that the UE may use to perform measurements. Depending on the UE capability, measurement gaps are required for the UE to perform inter-frequency and inter-RAT measurements.

SUMMARY OF THE APPLICATION

Embodiments of the present application provide a method and apparatus for handling time-sensitive transmission.

An embodiment of the present application provides a method. The method may include: determining there is an overlap between a first time period for performing a measurement and a second time period for data transmission or data reception; and determining whether the data transmission or the data reception is performed based on a rule.

In an embodiment of the present application, the method may further include: performing the data transmission or the data reception based on the rule. Alternatively, the method may further include: ignoring the measurement based on the rule.

In an embodiment of the present application, the data transmission or the data reception may include at least one of: transmitting data on uplink shared channel (UL-SCH); monitoring physical downlink control channel (PDCCH); receiving data on downlink shared channel (DL-SCH); transmitting hybrid automatic repeat request (HARM) feedback; transmitting scheduling request (SR); transmitting channel state information (CSI); and reporting sounding reference signal (SRS).

In an embodiment of the present application, the rule is preconfigured or predetermined. The rule is enabled per traffic, per user equipment (UE), per medium access control (MAC) entity, per data radio bearer (DRB), per logical channel, or per data flow.

In an embodiment of the present application, the rule may include performing the data transmission or the data reception if packet data convergence protocol (PDCP) retransmission for survival time occurs. The PDCP retransmission for the survival time is performed by a PDCP entity which is associated with an acknowledged mode (AM) or unacknowledged mode (UM) radio link control (RLC) entity.

In an embodiment of the present application, performing the PDCP retransmission for the survival time comprises: retransmitting at least one PDCP data protocol data unit (PDU). Performing the PDCP retransmission for the survival time comprises: retransmitting at least one indicated PDCP PDU.

In another embodiment of the present application, the rule may include performing the data transmission or the data reception when a timer is running. The timer is configured per PDCP service data unit (SDU), per PDCP PDU, per DRB, per flow, or per traffic. The timer is started when a PDCP transmission transits to an urgent state. The urgent state is configured per PDCP SDU, per PDCP PDU, per DRB, per flow, or per traffic. The timer is started when a second timer expires, wherein the second timer starts when a PDCP transmission is transmitted; or the timer is started when Nth unsuccessful reception of a PDCP transmission occurs; or the timer is started when a channel quality lower than a threshold occurs. The timer is stopped when the PDCP transmission transits to a normal state.

In another embodiment of the present application, the rule may include performing the data transmission if an uplink transmission of packet duplication is performing. The uplink transmission of the packet duplication is activated on two or more logic channels for achieving a quality of service (QoS) requirement. The uplink transmission of the packet duplication is activated when: reference signal receiving power (RSRP) of a cell corresponding to a primary logic channel for the packet duplication is lower than a first threshold; and RSRP of a cell corresponding to a secondary logic channel for the packet duplication is higher than a second threshold, and the secondary logic channel is activated.

The QoS requirement is represented by at least one of: a timer expiration which is used to decide a data transmission is in an urgent state; Nth unsuccessful reception; and existence of survival time relevant parameter. The method may further include: starting a timer associated with survival time when the uplink transmission of the packet duplication is activated; and stopping the timer when the uplink transmission of the packet duplication successfully completes. The uplink transmission of the packet duplication is deactivated when: RSRP of a cell corresponding to the primary logic channel is higher than the first threshold; and RSRP of a cell corresponding to the secondary logic channel is lower than the second threshold.

In another embodiment of the present application, the rule may include: performing the data transmission or the data reception in the second time period; and performing the measurement in a third time period after the data transmission or data reception is completed. The third time period is configured by a base station or a UE implementation.

In another embodiment of the present application, PDCP Data PDUs for the PDCP retransmission for survival time is considered as a PDCP data volume for AM or UM DRBs configured with a label associated with a QoS requirement.

Another embodiment of the present application provides a method. The method may include: transmitting a signal for handling an overlap between a first time period for performing a measurement at a UE and a second time period for data transmission or data reception at the UE, wherein the signal comprising a first indication for enabling a rule for handling the overlap or a second indication for configuring the rule. The rule may include, if the overlap occurs: performing the data transmission or the data reception. Alternatively, the rule may include, if the overlap occurs: ignoring the measurement. Alternatively, the rule may include, if the overlap occurs: performing the data transmission or the data reception in the first time period; and performing the measurement in a third time period after the data transmission or data reception is completed.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can solve an overlap between a time-sensitive networking (TSN) traffic and a measurement associated with a measurement gap to satisfy the QoS requirement of TSN traffic as well as guarantee the UE coverage.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
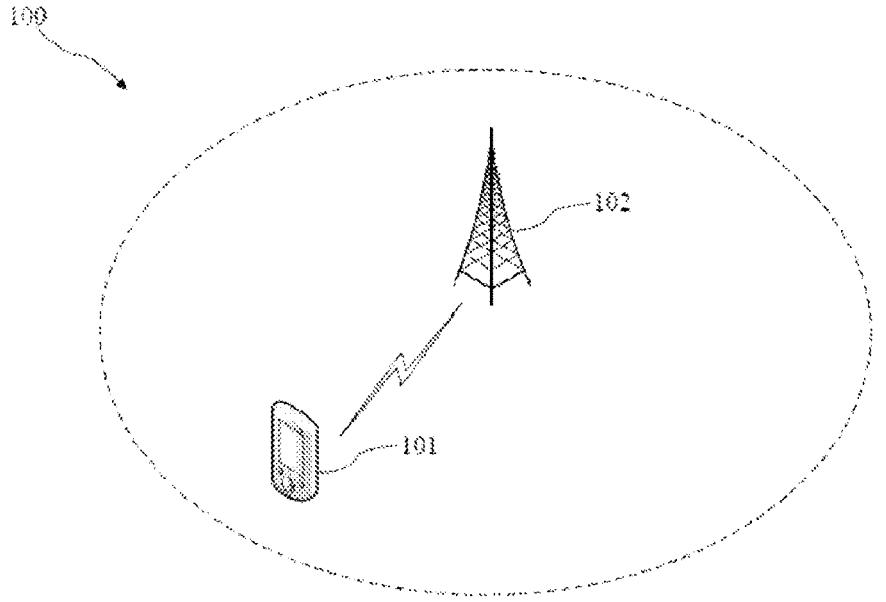
FIG. 1 illustrates a wireless communication system according to some embodiments of the present application.

FIG. 1 illustrates a wireless communication system 100 according to some embodiments of the present application.

Referring to FIG. 1, the wireless communication system 100 may include a UE 101 and a BS 102. Although a specific number of UE 101 and BS 102 are depicted in FIG. 1, it is contemplated that additional UEs 101 and BSs 102 may be available in the wireless communication system 100.

A BS 102 may be distributed over a geographic region, and may communicate with a core network (CN) node. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g. televisions connected to the Internet), set-top boxes, game consoles, security systems (including security cameras), vehicle on-board computers, network devices (e.g. routers, switches, and modems), Internet of Thing (IoT) devices, industrial Internet-of-Things (IIoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

In new radio (NR), even for serving cell's measurement, measurement gap may also be necessary, given that the serving cell's synchronization signal block (SSB) could be outside the active bandwidth part (BWP). In NR, the length of measurement gap could be from 1.5 ms to 6 ms depending on the frequency of the serving cell and the target cell. According to the current MAC specification TS38.321, during measurement gaps, the UE shall not perform data transmission or data reception except for messages related to random access.

For time-sensitive transmission, for example, according to TR 22.804, TSN traffic needs to be transmitted within bounds, e.g. 1 ms. Even if the measurement gap is set to 1.5 ms in case of per frequency range (per-FR) measurement, the QoS requirements for TSN traffic may not be met. Especially, if the TSN traffic has a sporadic pattern, the network cannot predict when data will be generated. In this case, the measurement gap may be an obstacle to the successful transmission of the TSN traffic.

Therefore, a solution for solving the overlap between a TSN traffic and a measurement associated with a measurement gap to satisfy the QoS requirement of TSN traffic as well as guarantee the UE coverage is needed.

Figure 2:
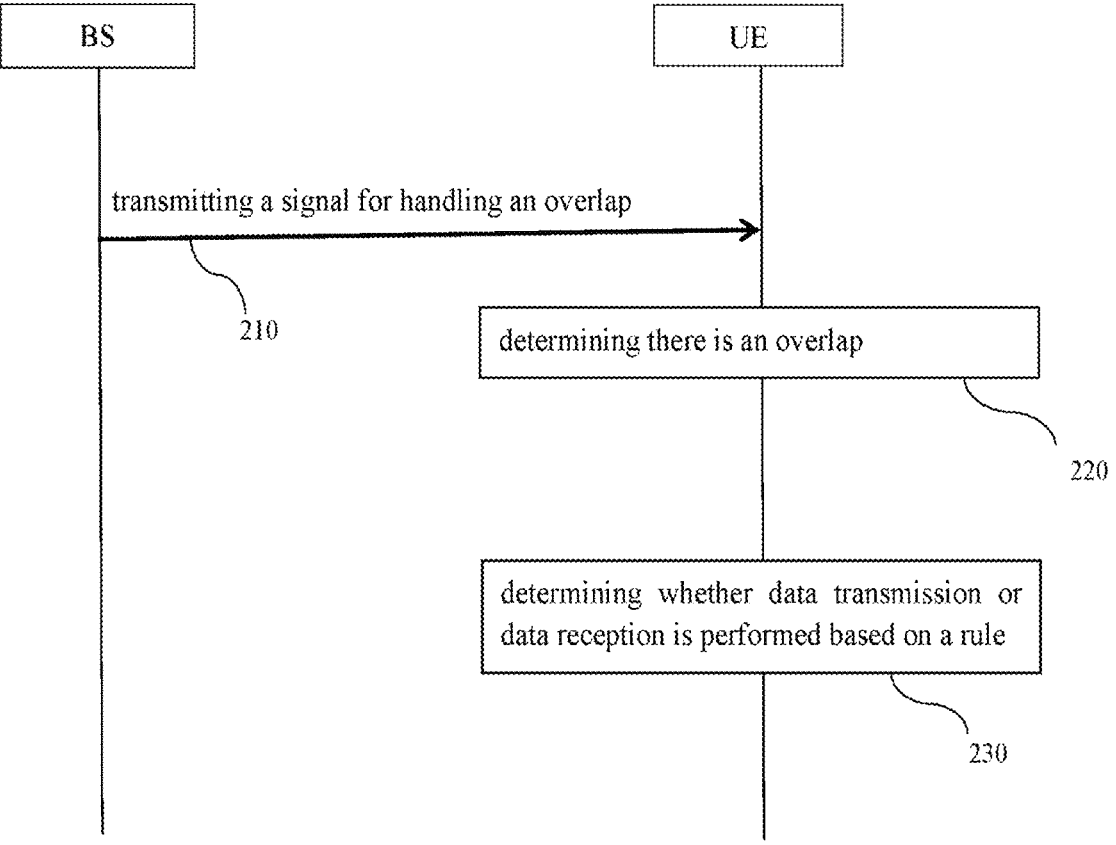
FIG. 2 illustrates a flow diagram illustrating a method for handling time-sensitive transmission according to some embodiments of the present application.

FIG. 2 illustrates a flow diagram illustrating a method for handling time-sensitive transmission according to some embodiments of the present application.

As shown in FIG. 2, in step 210, BS transmits a signal for handling an overlap to UE. For example, the overlap is an overlap between a time period for performing a measurement at the UE and another time period for data transmission or data reception at the UE. In an example, the time period for performing a measurement indicates a measurement gap or SSB-based measurement timing configuration (SMTC). Synchronization signal and physical broadcast channel (PBCH) block is abbreviated as SSB. As discussed above, the measurement gap indicates periods that the UE may use to perform measurements. SMTC is an SSB-based measurement timing configuration and used to indicate the timing needs to measure the SSB by a UE and the UE may measure SSB according to the timing configuration indicated by SMTC configuration. In the following description, taking the measurement gap as an example as the time period for performing a measurement. It should be understood that the embodiments or examples in the present application for the measurement gap also applies to SMTC.

The time period for data transmission or data reception at the UE may indicate the time resources configured by the BS for the UE to perform data transmission or data reception, such as a time-sensitive data transmission or reception.

In an example, the signal transmitted by the BS for handling the overlap may include an indication for enabling a rule for handling the overlap. In another example, the signal transmitted by the BS for handling the overlap may include an indication for configuring the rule.

In some embodiments, the rule can be called rule "override gap", it should be understood that other names can be called for the rule. According to some embodiments of the present application, the rule may be enabled or configured per traffic, per user equipment (UE), per medium access control (MAC) entity, per data radio bearer (DRB), per logical channel, or per data flow, or per resource configuration, or per configured grant configuration, or per semi-persistent-scheduling configuration.

In an example, the rule can be preconfigured by a BS or predetermined. In an example, the rule is preconfigured or predetermined per traffic, per UE, per entity, per DRB, per logical channel, or per data flow, or per resource configuration, or per configured grant configuration, or per semi-persistent-scheduling configuration.

If the overlap occurs, in an example, the rule may include performing the data transmission or the data reception; in another example, the rule may include ignoring (or skipping) a measurement associated with a measurement gap; in yet another example, the rule may include performing the data transmission or the data reception and ignoring (or skipping) the measurement; in yet another example, the rule may include delaying the measurement, that is, performing the data transmission or the data reception firstly, and performing the measurement in another time period after completing the data transmission or data reception.

In step 220, the UE may determine whether such an overlap occurs. For example, the UE may determine such an overlap occurs when there is an overlap between the time resources allocated for data transmission or data reception and a measurement gap.

After determining an overlap occurs, in step 230, the UE determines whether the data transmission or the data reception will be performed based on the rule.

In some embodiments of the present application, the data transmission or the data reception may include at least one of the following:

transmitting data on uplink shared channel (UL-SCH);

monitoring physical downlink control channel (PDCCH);

receiving data on downlink shared channel (DL-SCH);

transmitting hybrid automatic repeat request (HARQ) feedback;

transmitting scheduling request (SR);

transmitting channel state information (CSI); and reporting sounding reference signal (SRS).

In the present application, the rule "override_gap" may be triggered by a condition, e.g. condition A, and the detail operations for the data transmission or the data reception can be described as follows:

During a measurement gap, the MAC entity may, on the Serving Cell(s) in the corresponding frequency range of the measurement gap configured by measGapConfig as specified in TS 38.331 [5]:

1> not perform the transmission of HARQ feedback, SR, and CSI;

1> not report SRS;

1> not transmit on UL-SCH except for condition A is satisfied (optionally, if override_gap configured) and Msg3 or the MSGA payload as specified in clause 5.4.2.2;

1> if the ra-ResponseWindow or the ra-ContentionResolutionTimer or the msgB-ResponseWindow is running:

2> monitor the PDCCH as specified in clauses 5.1.4 and 5.1.5.

1> else if condition A is satisfied if override_gap configured:

2> monitor the PDCCH;

2> receive on DL-SCH.

1> else:

2> not monitor the PDCCH;

2> not receive on DL-SCH.

Figure 3:
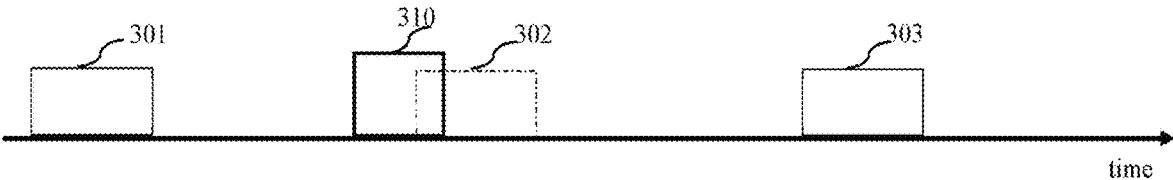
FIG. 3 is a schematic timing diagram showing a case when an overlap between a time-sensitive transmission and a measurement associated with the measurement gap occurs according to some embodiments of the present application.

FIG. 3 is a timing diagram showing a case when an overlap between a time-sensitive transmission and a measurement associated with the measurement gap occurs according to some embodiments of the present application. In FIG. 3, the rule may include performing the data transmission or the data reception and ignoring (or skipping) the measurement gap.

As shown in FIG. 3, reference numbers 301, 302, and 303 represent a measurement associated with a measurement gap respectively, and reference number 310 represents a data transmission. It should be understood that 310 may represent a data reception in another example.

As shown in FIG. 3, there is an overlap between the measurement 302 and the data transmission 310, according to the rule of performing the data transmission or the data reception and ignoring the measurement, the UE performs data transmission 310 and ignores the measurement 302.

According to some embodiments of the present application, there are some conditions to trigger the rule "override_gap". In an embodiment of the present application, the condition for triggering the rule "override_gap" may be when PDCP retransmission for survival time is performing. That is, the UE may perform the data transmission or data reception and ignore the measurement when PDCP retransmission for survival time occurs.

In 3GPP TS 22.104, the survival time is defined as the time that an application consuming a communication service may continue without an anticipated message. The survival time can be expressed as a period or, especially with cyclic traffic, as maximum number of consecutive incorrectly received or lost messages. In some examples, a communication service is considered unavailable if it does not meet the pertinent QoS requirements. If availability is one of these requirements, the system is considered unavailable if an expected message is not received within a specified time, which, at minimum, is the sum of maximum allowed end-to-end latency and survival time.

There are some trigger conditions for PDCP retransmission. In an example, the PDCP retransmission for the survival time may be triggered (or performed) after receiving a DRB. In another example, the PDCP retransmission for the survival time may be triggered after receiving a DRB multiplexing in a transport block (TB). For example, the DRB may be configured with a label, e.g. 'reTX for QoS' and the label could be associated with a QoS requirement, e.g. to avoid entering into 'survival time' or to recover from 'survival time'. It should be understood that the name of the label 'reTX for QoS' is just an example, it can be called another name in another example. In yet another example, the PDCP retransmission for the survival time may be triggered after receiving Nth NACK of the DRB or the DRB multiplexed in the TB. The value of "N" can be configured by upper layer, e.g. RRC layer.

In this embodiment, a PDCP entity may be indicated or requested to perform the PDCP retransmission. In an example, the retransmission or re-submission can be indicated by lower layers, e.g. MAC layer or RLC layer. For example, for MAC layer, if a DRB configured with 'reTX for QoS' is multiplexed in a TB and the TB is not successfully received for the Nth time, the MAC entity may indicate the upper layer (that is, PDCP layer) to retransmit the PDCP data PDU(s). For RLC layer, if a DRB configured with 'reTX for QoS' is not successfully received for the Nth time, the RLC entity indicates the upper layer (that is, PDCP layer) to retransmit the PDU(s). In another example, the retransmission or re-submission can be requested by upper layers, e.g. RRC layer. When it is requested by upper layer, it could be the lower layer indicates the Nth NACK to the upper layers, then upper layer requests the PDCP entity to retransmit or re-submit the requested PDCP data PDU(s). For example, if a DRB associated/configured with 'reTX for QoS' is multiplexed in the TB, the MAC layer indicates the corresponding PDU for PDCP retransmission, when the Nth not successful transmission is decided. Or if a DRB is associated/configured with 'reTX for QoS', the RLC layer indicates the corresponding PDU for PDCP retransmission when the nth not successful transmission is decided.

In this embodiment, in an example, the PDCP entity may retransmit, re-submit or submit again all PDCP data PDUs. In another example, the PDCP entity may retransmit, re-submit or submit again the indicated PDCP data PDU(s), for example the previously incorrected transmitted data PDU(s).

The retransmission function of the PDCP entity can be configured by upper layer. For example, the retransmission or re-submission or submission again function of the PDCP entity can be configured by RRC layer. For another example, the retransmission or re-submission or submission again for 'survival time' or QoS unsatisfied or 'urgent time' function of the PDCP entity can be configured by RRC as reTX for QoS'.

In this embodiment, the PDCP entity for performing the PDCP retransmission may be associated with an acknowledged mode (AM) or unacknowledged mode (UM) radio link control (RLC) entity. For example, for UM or AM DRBs, when lower/upper layers indicate/request PDCP retransmission for a radio bearer, the transmitting PDCP entity shall: perform retransmission of the indicated PDCP Data PDU(s), following the data submission procedure. After performing the above procedures, the transmitting PDCP entity shall follow the data submission procedure. In another example, for UM or AM DRBs which is associated/configured with 'reTX for QoS', when lower/upper layers indicate/request PDCP retransmission for a radio bearer, the transmitting PDCP entity shall: perform retransmission of the indicated PDCP Data PDU(s), following the data submission procedure. After performing the above procedures, the transmitting PDCP entity shall follow the data submission procedure.

For example, the data submission procedure is described as follows:

When submitting a PDCP PDU to lower layer, the transmitting PDCP entity shall:
  if the transmitting PDCP entity is associated with one RLC entity:
    submit the PDCP PDU to the associated RLC entity;
  else, if the transmitting PDCP entity is associated with at least two RLC entities:
    if the PDCP duplication is activated:
      if the PDCP PDU is a PDCP Data PDU:
        duplicate the PDCP Data PDU and submit the PDCP Data PDU to the associated RLC entities activated for PDCP duplication; else:
        submit the PDCP Control PDU to the primary RLC entity;
    else:
      if the split secondary RLC entity is configured; and
      if the total amount of PDCP data volume and RLC data volume pending for initial transmission (as specified in TS 38.322 [5]) in the primary RLC entity and the split secondary RLC entity is equal to or larger than ul-DataSphtThreshold:
        submit the PDCP PDU to either the primary RLC entity or the split secondary RLC entity;
      else:
        submit the PDCP PDU to the primary RLC entity.

In another embodiment of the present application, the condition for triggering the rule "override_gap" may be when a timer is running. That is, the UE may perform the data transmission or data reception and ignore the measurement gap once the timer, such as an urgent timer starts.

In this embodiment, the network (the BS) may configure the urgent timer. For example, the urgent timer is configured per PDCP service data unit (SDU), per PDCP PDU, per DRB, per flow, or per traffic, for example, to ensure the data transmission or data reception is in the required range of survival time.

Furthermore, the network may configure PDCP duplication with respect to urgent state. The urgent state can be indicated by lower layers, e.g. MAC layer, RLC layer. In another example, the urgent state can be indicated by upper layers, e.g. RRC layer.

In this embodiment, the urgent state can be represented by several conditions. The urgent state can be configured per PDCP SDU, per PDCP PDU, or per DRB, per flow, per traffic. In an example, the urgent state can be represented by another timer expiration which is used to decide the PDCP SDU, the PDCP PDU, the DRB, the traffic, the flow, or the DRB is not in a normal state (but in the urgent state or 'survival state'). In another example, the urgent state can be represented by Nth unsuccessful reception of PDCP transmission. The value of "N" can be configured by upper layer e.g. RRC layer. In yet another example, the urgent state can be represented by the channel quality being lower than a threshold.

When a PDCP transmission, such as, the PDCP SDU, PDCP PDU, traffic, DRB, or flow transits to the urgent state, the urgent timer starts. And then, when the urgent timer starts, the configured PDCP duplication for indicated PDCP data PDU(s) can be activated.

Alternatively, when the PDCP transmission, such as, the PDCP SDU, PDCP PDU, traffic, DRB, or flow transits to a normal state, the urgent timer stops. In an example, the normal state can be represented by the running of another timer. In another example, the normal state can be represented by the Nth successful reception. The value of "N" can be configured by upper layer e.g. RRC layer. When the urgent timer stops (or expires), the configured PDCP duplication for the indicated PDCP data PDUs can be deactivated.

In yet another embodiment of the present application, the condition for triggering the rule "override_gap" may be when a new uplink transmission of packet duplication is performing. For example, the new uplink transmission of packet duplication on all or part of configured legs (e.g. indicated number of legs, or indicated primary and/or secondary legs) is performing. The leg may be also called RLC leg, RLC entity or logical channel. That is, the UE may perform the data transmission or data reception and ignore the measurement once the new uplink transmission of packet duplication starts.

In this embodiment, the network (such as the BS) may configure PDCP duplication. For example, the configuration can be the PDCP duplication for a QoS requirement, survival time, or urgent time. In an example, the QoS requirement may indicate a requirement for survival time, urgent time or urgent state.

In this embodiment, the QoS requirement, the survival time, or the urgent time can be represented by several conditions. In an example, the QoS requirement, the survival time, or the urgent time can be represented by another timer expiration which is used to decide a data transmission, for example, traffic, flow, or DRB is not in a normal state (but in the urgent state or 'survival state'). In another example, the QoS requirement, the survival time, or the urgent time can be represented by Nth unsuccessful reception of a PDCP transmission. The value of "N" can be configured by upper layer, e.g. RRC layer. In yet another example, the QoS requirement, the survival time, or the urgent time can be represented by the existence of a survival time relevant parameter.

Furthermore, the QoS requirement, the survival time, or the urgent time can be indicated by the lower layers, e.g. MAC layer, or RLC layer. In another example, the QoS requirement, the survival time, or the urgent time can be indicated by upper layers, e.g. RRC layer.

The configured duplication for the indicated PDCP PDU(s) is activated on the corresponding secondary leg(s) when the QoS requirement, the survival time, or the urgent time is indicated to the UE.

In an example, the configured duplication for the indicated PDCP PDU(s) is activated on the corresponding secondary leg(s) when the QoS requirement is indicated to the UE and if RSRP of a cell corresponding to a primary leg for a packet duplication is lower than a threshold (the threshold may be configured by the network). As an example, there is 1 primary RLC entity and 3 RLC entities, when the QoS requirement is indicated to the UE while RSRP of the cell corresponding to the primary RLC entity is lower than the threshold, the configured duplication for the indicated PDCP PDU(s) is activated on the all the RLC entities (e.g. 3 secondary RLC entities and 1 primary RLC entity).

In another example, the configured duplication for the indicated PDCP PDU(s) is activated on corresponding secondary RLC entities when the QoS requirement is indicated to the UE and if RSRP of a cell corresponding to a primary RLC entity for a packet duplication is lower than a threshold (the threshold could be configured by the network) and RSRP of a cell corresponding to a secondary RLC entity for the packet duplication is higher than another threshold (the threshold could be configured by the network) and the secondary RLC entity is activated. The two thresholds may be the same or different. As an example, there is 1 primary RLC entity and 3 secondary RLC entities configured for PDCP duplication, when the QoS requirement is indicated to the UE while a primary RLC entity and a secondary RLC entity has been performing PDCP duplication, the configured duplication for the indicated PDCP PDU(s) is activated also on the remaining secondary RLC entities (e.g. the additional 2 secondary RLC entities).

Furthermore, for example, the PDCP layer may indicate (or note) the lower layers that duplication is activated when the activation is decided by PDCP layer. In another example, the PDCP layer is indicated (or noted) by the lower layers that duplication is activated when the activation is decided by lower layers or upper layers.

In a further example, an urgent timer (for example, associated with survival time, if it is configured for the UE) may start when the duplication is activated. When the indicated PDCP data PDU of the duplication successfully completes, the urgent timer stops. When the urgent timer stops, the duplication is deactivated. In another example, the duplication is deactivated after the successful reception.

Alternatively, the duplication is deactivated on the corresponding secondary RLC entities when RSRP of a cell corresponding to the primary RLC entity is higher than a threshold and RSRP of a cell corresponding to the secondary RLC entity is lower than another threshold. The thresholds may be configured by higher layer. In another example, the duplication is deactivated when all the secondary RLC entities are deactivated.

Figure 4:
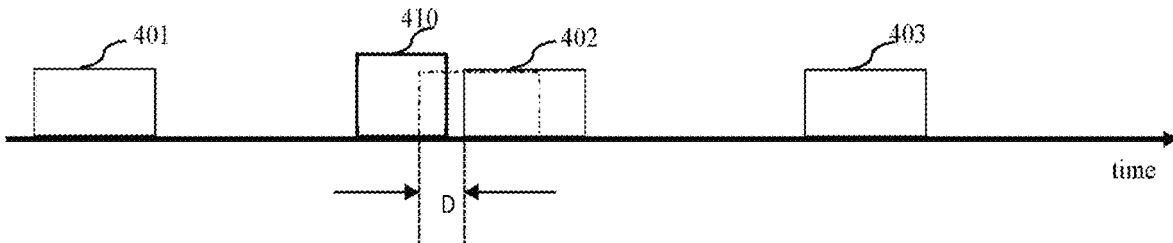
FIG. 4 is a schematic timing diagram showing another case when an overlap between a time-sensitive transmission and a measurement associated with the measurement gap occurs according to some embodiments of the present application.

FIG. 4 is a timing diagram showing another case when an overlap between a time-sensitive transmission and a measurement associated with the measurement gap occurs according to some embodiments of the present application. In FIG. 4, the rule may include delaying a measurement associated with the measurement gap, that is, performing the measurement after performing the data transmission or the data reception.

As shown in FIG. 4, reference numbers 401, 402, and 403 represent a measurement associated with a measurement gap respectively, and reference number 410 represents a data transmission. It should be understood that 410 may represent a data reception in another example.

As shown in FIG. 4, there is an overlap between the measurement 402 and the data transmission 410, according to the rule of delaying the measurement, the UE delays the measurement 402 for a delay time D and performs data transmission 410. And then after performing data transmission 410, the UE performs the delayed measurement 402.

As discussed above, there are some conditions to trigger the rule "override_gap". In an embodiment of the present application, the condition for triggering the rule "override_gap" of delaying the measurement associated with a measurement gap may be that there is a signal (or a reference signal) to support the relevant measurement if the measurement is delayed (or extended) till there is no overlap with the data transmission or data reception. The signal (or the reference signal) for the measurement corresponds to the configuration of the measurement gap or SMTC. In an example, the delay time D as shown in FIG. 4 may be configured by the network. In another example, the delay time D may be configured by UE implementation.

According to some embodiments of the present application, PDCP Data PDUs for the PDCP retransmission for survival time is considered as a PDCP data volume for AM or UM DRBs configured with the label, such as 'reTX for survival time'.

In particular, the data volume calculation may be described as follows:

For the purpose of MAC buffer status reporting, the transmitting PDCP entity shall consider the following as PDCP data volume:

for AM/UM DRBs configure with 'reTX for survival time', the PDCP Data PDUs to be retransmitted.

For PDCP duplication, the data volume calculation may be described as follows:

If the transmitting PDCP entity is associated with at least two RLC entities, when indicating the PDCP data volume to a MAC entity for B S R triggering and Buffer Size calculation (as specified in TS 38.321 [4] and TS 36.321 [12]), the transmitting PDCP entity shall:

if the PDCP duplication is activated:

indicate the PDCP data volume to the MAC entity associated with the primary RLC entity;

indicate the PDCP data volume excluding the PDCP Control PDU to the MAC entity associated with the RLC entity other than the primary RLC entity activated for PDCP duplication;

indicate the PDCP data volume as 0 to the MAC entity associated with RLC entity deactivated for PDCP duplication;

else:

if the split secondary RLC entity is configured; and if the total amount of PDCP data volume and RLC data volume pending for initial transmission (as specified in TS 38.322 [5]) in the primary RLC entity and the split secondary RLC entity is equal to or larger than ul-DataSphtThreshold:

indicate the PDCP data volume to both the MAC entity associated with the primary RLC entity and the MAC entity associated with the split secondary RLC entity;

indicate the PDCP data volume as 0 to the MAC entity associated with RLC entity other than the primary RLC entity and the split secondary RLC entity;

else:

indicate the PDCP data volume to the MAC entity associated with the primary RLC entity;

indicate the PDCP data volume as 0 to the MAC entity associated with the RLC entity other than the primary RLC entity.

Therefore, the above described embodiments can satisfy the QoS requirement of TSN traffic as well as guarantee the UE coverage.

Figure 5:
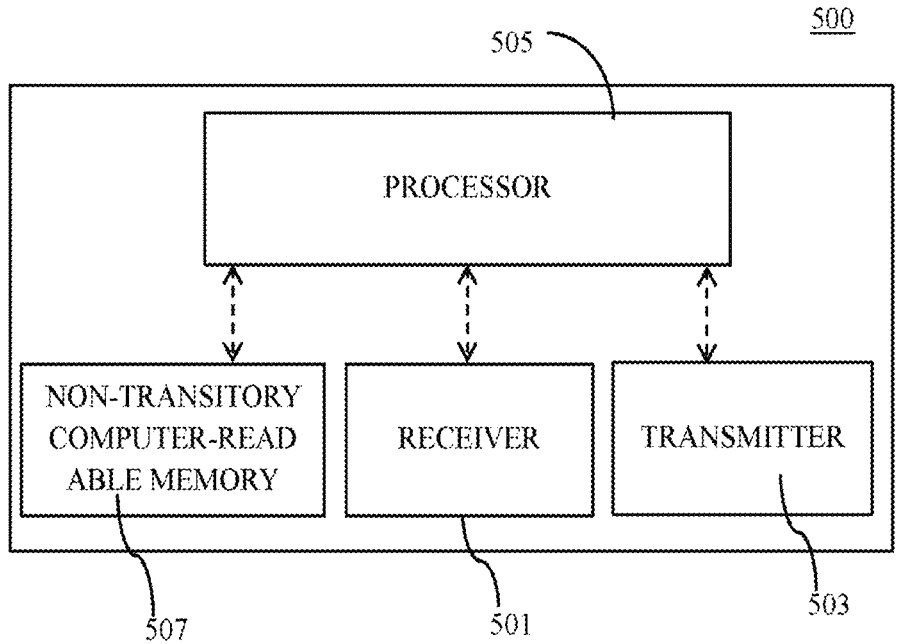
FIG. 5 illustrates an apparatus according to some embodiments of the present application.

FIG. 5 illustrates an apparatus according to some embodiments of the present application. In some embodiments of the present disclosure, the apparatus 500 may be a UE 101 as illustrated in FIG. 1 or other embodiments of the present application.

As shown in FIG. 5, the apparatus 500 may include a receiver 501, a transmitter 503, a processer 505, and a non-transitory computer-readable medium 507. The non-transitory computer-readable medium 507 has computer executable instructions stored therein. The processer 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the method according to embodiments of the present application.

Figure 6:
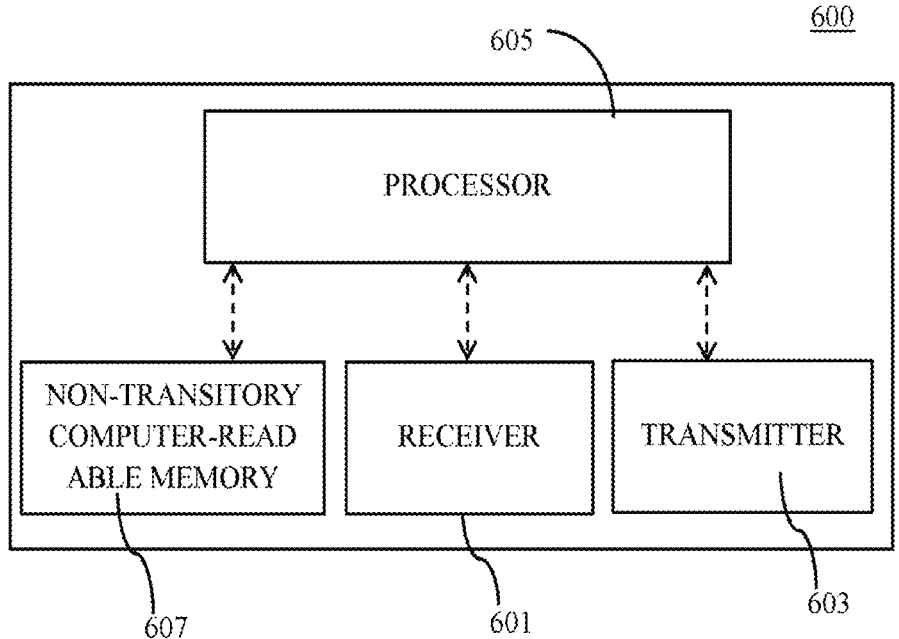
FIG. 6 illustrates an apparatus according to some embodiments of the present application.

FIG. 6 illustrates an apparatus according to some embodiments of the present application. In some embodiments of the present disclosure, the apparatus 600 may be a BS 102 as illustrated in FIG. 1 or other embodiments of the present application.

As shown in FIG. 6, the apparatus 600 may include a receiver 601, a transmitter 603, a processer 606, and a non-transitory computer-readable medium 607. The non-transitory computer-readable medium 607 has computer executable instructions stored therein. The processer 606 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a user equipment (UE), the method comprising:

receiving an indicator of an urgent state for data transmission, wherein the indicator of the urgent state is triggered by a negative acknowledgement (NACK) received in a medium access control (MAC) layer; and performing a data submission procedure according to the urgent state, the data submission procedure including activating packet data convergence protocol (PDCP)

duplication and associated radio link control (RLC) entities for the PDCP duplication of protocol data units (PDUs), the PDCP duplication is activated when reference signal receiving power (RSRP) of a cell corresponding to a primary logic channel for packet duplication is lower than a first threshold and RSRP of a cell corresponding to a second logical channel for the packet duplication is higher than a second threshold.

2. The method of claim 1, wherein the urgent state is configurable per data radio bearer (DRB).

3. The method of claim 2, wherein the DRB is usable for communication services with survival time.

4. The method of claim 1, wherein the PDCP duplication is configured for a quality of service (QoS).

5. The method of claim 1, further comprising:

receiving an additional indicator of a normal state; and deactivating the PDCP duplication based at least in part on the additional indicator of the normal state.

6. The method of claim 5, wherein the normal state is indicated by a successful reception.

7. A user equipment (UE) for wireless communication, comprising:

at least one memory; and at least one processor coupled with the at least one memory and configured to cause the UE to:

receive an indicator of an urgent state for data transmission, wherein the indicator of the urgent state is triggered by a negative acknowledgement (NACK) received in a medium access control (MAC) layer; and perform a data submission procedure according to the urgent state, the data submission procedure including to activate packet data convergence protocol (PDCP) duplication and associated radio link control (RLC) entities for the PDCP duplication of protocol data units (PDUs), the PDCP duplication is activated when reference signal receiving power (RSRP) of a cell corresponding to a primary logic channel for packet duplication is lower than a first threshold and RSRP of a cell corresponding to a second logical channel for the packet duplication is higher than a second threshold.

8. The UE of claim 7, wherein the urgent state is configurable per data radio bearer (DRB).

9. The UE of claim 8, wherein the DRB is usable for communication services with survival time.

10. The UE of claim 7, wherein the PDCP duplication is configured for a quality of service (QoS).

11. The UE of claim 7, wherein the at least one processor is configured to cause the UE to:

receive an additional indicator of a normal state; and deactivate the PDCP duplication based at least in part on the additional indicator of the normal state.

12. The UE of claim 11, wherein the normal state is indicated by a successful reception.

* * * * *